UNITED STATES PATENT OFFICE.

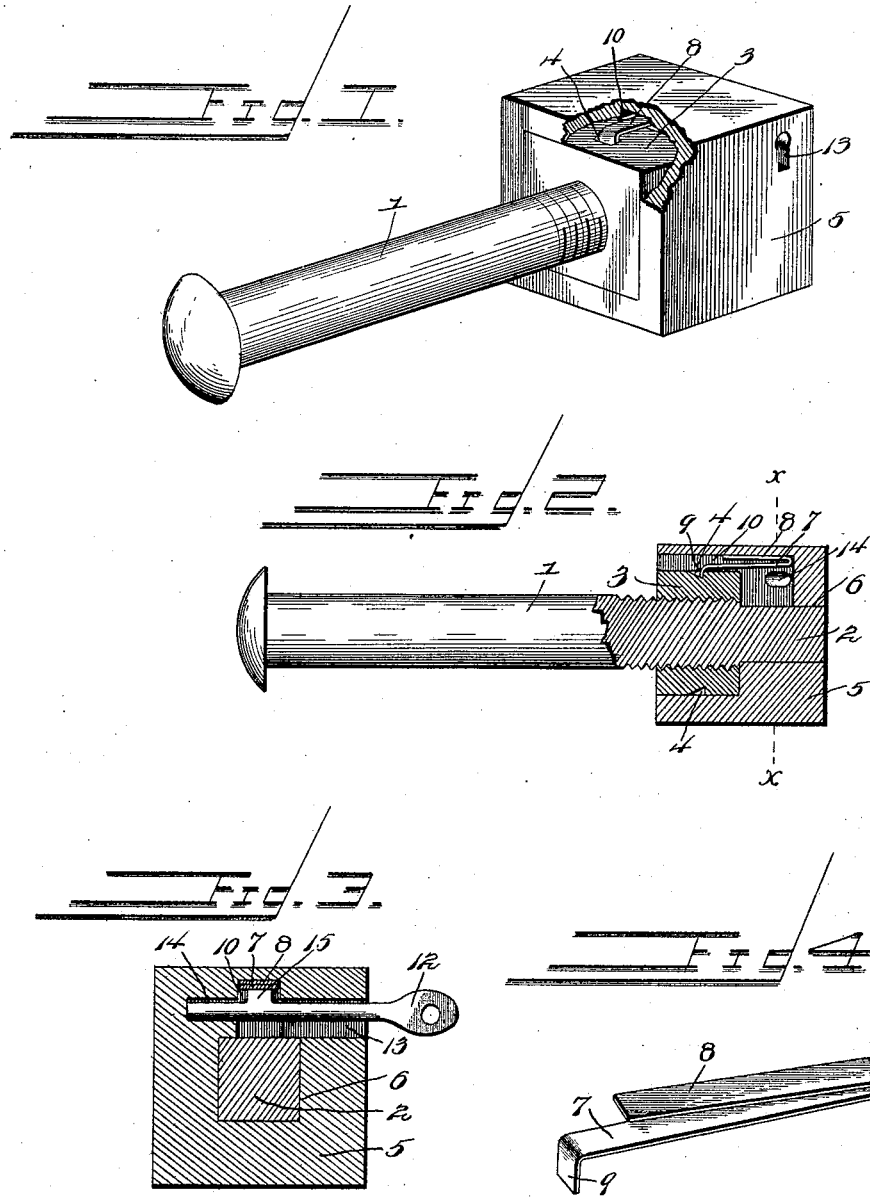

WILLIAM C. BOGARD, OF CHARLESTON, MISSOURI, ASSIGNOR OF ONE-HALF TO W. E. GLOVER, OF SAME PLACE.

NUT-LOCK.

SPECIFICATION forming part of Letters Patent No. 620,219, dated February 28, 1899.

Application filed October 29, 1898. Serial No. 694,943. (No model.)

*To all whom it may concern:*

Be it known that I, WILLIAM C. BOGARD, a citizen of the United States, residing at Charleston, in the county of Mississippi and State of Missouri, have invented a new and useful Nut-Lock, of which the following is a specification.

This invention relates to nut-and-bolt locks; and the object thereof is to provide means whereby the nut may be effectively locked against accidental displacement and may be quickly and easily removed without destroying any portion of the device, so as to permit of the renewed use thereof.

To this end the invention consists in the novel combination and arrangement, as hereinafter described, and particularly pointed out in the claims.

In the drawings, Figure 1 is a perspective view of a bolt and nut, the latter being broken away and having my improvements applied thereto. Fig. 2 is a longitudinal sectional view thereof. Fig. 3 is a transverse sectional view taken on the line *x x* of Fig. 2. Fig. 4 is a detail perspective view of the spring-catch removed.

Like numerals of reference denote like and corresponding parts in each of the several figures of the drawings.

Referring to the accompanying drawings, 1 designates a threaded bolt of usual construction, having its end reduced and angled or flattened, as at 2. The nut 3 is of usual form, but is provided in each of its edges with a notch or recess 4.

The means for locking the nut upon the bolt comprises a cap-piece 5, open at its inner end and adapted to receive the nut therein and having its outer end closed and provided with an angular opening 6 to correspond with the angular end 2 of the bolt and adapted to fit thereon, so that the cap-piece cannot be turned independently of the bolt. A spring-catch 7 is mounted within the cap-piece to engage with one of the notches of the nut, and thus connect the nut and cap together. This catch is preferably formed from a single length of flat spring metal bent intermediate its ends and folded upon itself to form an attaching-arm 8 and the spring-catch proper. The free end of the catch is bent at an angle thereto to form a catch-head 9. The catch is mounted within a longitudinal recess 10, formed in one of the inner faces of the cap, and the spring-catch is mounted thereon by means of its attaching-arm in any preferred manner.

To lock the nut, the cap-piece is placed over the angular end of the bolt and inclosing the nut, with the catch-head 9 engaging one of the notches of the nut, thereby connecting the nut and cap-piece together. As the cap-piece is fitted about the reduced and flattened end of the bolt it is prevented from turning thereon, as will be understood, and thereby the nut is locked against turning.

To remove the nut, a key 12 is provided. This key is adapted to be inserted through a keyhole-slot 13, formed through one of the walls of the cap, with its end seated in a recess 14, formed in the opposite inner wall of the cap. In this position the key may be turned to engage with the spring-catch and lift its head out of the notch in the side of the nut, when the cap is disengaged from the nut and may be withdrawn from the bolt and the nut is free to be screwed in either direction.

The end of the bolt may be reduced to a rectangular form, as shown, or to any other desired angular form, the object being to prevent the cap from turning thereon.

Changes in the form, proportion, and minor details may be made without departing from the spirit and scope or sacrificing any of the advantages of the present invention.

Having thus described the invention, what I claim is—

1. The combination with a bolt having an angular end and a nut, of a cap-piece having an angular opening formed in its end, a spring-catch mounted within the cap and adapted to engage the nut, said spring being entirely inclosed within the cap and protected thereby against accidental disengagement from the nut, and means for disengaging the catch from the nut, substantially as shown and described.

2. The combination with a bolt having an angular end, and a nut provided with notches or recesses in its sides, of a cap-piece having an angular opening formed in its end, a longitudinal recess formed in one of its inner faces, a spring-catch mounted in said recess, and means for disengaging the catch from the recess of the nut, substantially as shown and described.

3. The combination with a bolt having an angular end, and a nut provided with notches or recesses in its sides, of a cap-piece having an angular opening in its end, a longitudinal recess in one of its inner faces, a spring-catch formed from a single length of flat spring metal bent intermediate its ends and folded upon itself forming an attaching-arm and the spring-catch proper, the free end of the latter being bent to form a catch-head, the attaching-arm being mounted in the longitudinal recess, and means for disengaging the spring-catch from the recess of the nut, substantially as shown and described.

4. The combination with a bolt having an angular end, and a nut provided with notches or recesses in its sides, of a cap-piece having an angular opening formed through its end, a spring-catch mounted within the cap and adapted to engage with one of the notches of the nut and a keyhole-slot formed through one side of the cap and a recess formed in the opposite inner wall, said keyhole-slot and recess being adapted to receive a key, whereby the spring-catch may be disengaged from the notch of the nut, substantially as shown and described.

In testimony that I claim the foregoing as my own I have hereto affixed my signature in the presence of two witnesses.

WILLIAM C. BOGARD.

Witnesses:
GEO. M. MILEY,
E. M. ROWE.